(12) United States Patent
Fukushima et al.

(10) Patent No.: US 7,689,220 B2
(45) Date of Patent: Mar. 30, 2010

(54) RADIO COMMUNICATION TERMINAL AND COMMUNICATION METHOD

(75) Inventors: Masaru Fukushima, Machida (JP); Hiroyuki Hidaka, Kawasaki (JP)

(73) Assignee: Kyocera Corporation, Kyoto (JP)

( * ) Notice: Subject to any disclaimer, the term of this patent is extended or adjusted under 35 U.S.C. 154(b) by 893 days.

(21) Appl. No.: 11/422,866

(22) Filed: Jun. 7, 2006

(65) Prior Publication Data

US 2008/0039088 A1    Feb. 14, 2008

(30) Foreign Application Priority Data

Jun. 9, 2005    (JP)    .............................. 2005-169296

(51) Int. Cl.
*H04Q 7/20* (2006.01)
(52) U.S. Cl. ................. 455/436; 455/550.1; 455/556.1; 370/331
(58) Field of Classification Search ............. 455/550.1, 455/552.1, 556.1, 436; 370/328, 331
See application file for complete search history.

(56) References Cited

U.S. PATENT DOCUMENTS

| | | | |
|---|---|---|---|
| 7,006,827 | B2 | 2/2006 | Masuda et al. |
| 7,328,020 | B2 | 2/2008 | Masuda et al. |
| 2001/0034243 | A1 | 10/2001 | Masuda et al. |
| 2002/0031139 | A1* | 3/2002 | Yoshizawa ................... 370/419 |
| 2004/0204020 | A1* | 10/2004 | Kuramitsu ............... 455/550.1 |
| 2004/0255331 | A1 | 12/2004 | Inoue et al. |
| 2005/0201469 | A1* | 9/2005 | Sievers et al. .......... 375/240.24 |
| 2005/0221826 | A1* | 10/2005 | Lee ............................. 455/436 |
| 2006/0058060 | A1 | 3/2006 | Masuda et al. |

FOREIGN PATENT DOCUMENTS

| | | |
|---|---|---|
| CN | 1605178 A | 4/2005 |
| EP | 1148753 A2 | 10/2001 |

OTHER PUBLICATIONS cdma 2000 High Rate Packet Data Air Interface 3 GPP2 C. S0024 Version 4.0 (3GPP2, Oct. 2002).
cdma 2000 High Rate Packet Data Air Interface 3 GPP2 C.S0024-A Version 1.0 (3GPP2, Mar. 2004).
Chinese language office action and its English language translation for corresponding Chinese application 200610091244.0.
Chinese language office action and its English language translation for corresponding Chinese application 200610091244.0 lists the references above.

* cited by examiner

*Primary Examiner*—Danh C Le
(74) *Attorney, Agent, or Firm*—Hogan & Hartson LLP (57) ABSTRACT

A radio communication terminal according to the present invention includes: a transmitter-receiver configured to transmit voice and image data to a destination communication terminal, and to receive the voice and image data from the destination communication terminal; a connection processor configured to control a handoff between communication modes of which communication capabilities are different from each other; and a transmission controller configured to control the transmission of voice or image data by the transmitter-receiver, and/or the transmission of voice or image data by the destination communication terminal according to a communication capability of a communication mode at a destination of handoff, when the connection processor performs the handoff in a case where the voice and image data are being transmitted to and received from the destination communication terminal through the transmitter-receiver.

17 Claims, 6 Drawing Sheets

1X EV-DO REV.A

| DATA RATE (kbps) |
|---|
| 19.2 |
| 38.4 |
| 76.8 |
| 115.2 |
| 153.6 |
| 230.4 |
| 307.2 |
| 460.8 |
| 614.4 |
| 921.6 |
| 1228.8 |
| 1843.2 |

FIG.6B

1X EV-DO REV.0

| DATA RATE (kbps) |
|---|
| 0.0 |
| 9.6 |
| 19.2 |
| 38.4 |
| 76.8 |
| 153.6 |

RADIO COMMUNICATION TERMINAL AND COMMUNICATION METHOD

CROSS-REFERENCE TO RELATED APPLICATIONS

This application is based upon and claims the benefit of priority from the prior Japanese Patent Application No. P2005-169296, filed on Jun. 9, 2005; the entire contents of which are incorporated herein by reference.

BACKGROUND OF THE INVENTION

1. Field of the Invention

The present invention relates to a radio communication terminal which performs a handoff between communication modes whose communication capabilities are different from each other, and also relates to a communication method in a case of performing the handoff.

2. Description of the Related Art

Conventionally, in a mobile communication system using a CDMA (code division multiple access) mode, a plurality of modes are generally adopted and introduced as modes for transmitting data containing moving image data transmitted and received by applications such as an IP videophone.

For example, in cdma2000, followings are specified as modes for transmitting data: a communication mode (1x) using circuit switching; a communication mode (1x EV-DO Rev. 0) realizing data rates (transmission speed) of approximately 153.6 kbps for an uplink and approximately 2.4 Mbps for a downlink by using a packet switching mode; and a communication mode (1x EV-DO Rev.A) which further speeds up those communication modes, and which realizes data rates (transmission speed) of approximately 1.8 Mbps for an uplink and approximately 3.0 Mbps for a downlink (for example, refer to "cdma2000 High Rate Packet Data Air Interface 3GPP2 C.S0024 Version 4.0," 3GPP2, October 2002 (Section 8.5.6.1, Section 9.3.1.3.2.3.2), and "cdma2000 High Rate Packet Data Air Interface 3GPP2 C.S0024-A Version 1.0," 3GPP2, March 2004 (Section 14.2.1.3.1.1, Section 14.3.1.3.1.1)).

SUMMARY OF THE INVENTION

Incidentally, in the mobile communication system using the CDMA mode as described above, the fact is that apparatuses supporting the latest mode are deployed by stages from one communication area to another, the communication mode (for example, 1x EV-DO Rev.A as described above) providing the fastest data rates is not necessarily supported in all of the communication areas.

Therefore, in the mobile communication system complying with cdma2000 as described above, there has been a problem in a case where a radio communication terminal executing an application such as an IP videophone, which requires a high-speed data rate, in an communication area where 1x EV-DO Rev.A is supported. Specifically, the problem arises where the radio communication terminal performs a handoff (handover) from that communication area to a different communication area where 1x EV-DO Rev.A is not supported but communication modes up to 1x EV-DO Rev.0 is supported for example. More specifically, QoS control is not supported and a data rate for an uplink is low in 1x EV-DO Rev.0, the radio communication terminal cannot provide a stable communication service by using the application such as an IP videophone.

Accordingly, the present invention has been made in consideration of the above described situations. An Object of the present invention is to provide a radio communication terminal and a communication method which are capable of continuing a communication service of a certain level even in a case where a handoff is performed between communication areas where communication modes having different communication capabilities are used.

For the purpose of solving the above described problem, the present invention is provided with the following characteristics. First of all, a first characteristic of the present invention is summarized as a radio communication terminal including: a transmitter-receiver configured to transmit voice and image data to a destination communication terminal, and to receive the voice and image data from the destination communication terminal; a connection processor configured to control a handoff between communication modes of which communication capabilities are different from each other; and a transmission controller configured to control the transmission of voice or image data by the transmitter-receiver, and/or the transmission of voice or image data by the destination communication terminal according to a communication capability of a communication mode at a destination of handoff, when the connection processor performs the handoff in a case where the voice and image data are being transmitted to and received from the destination communication terminal through the transmitter-receiver.

According to the characteristic as described above, at least any one of transmission of voice or image data by the transmitter-receiver and transmission of voice or image data by the destination communication terminal can be controlled according to a communication capability of a communication mode at a destination of a handoff.

Accordingly, for example, communications with the destination communication terminal are kept from being discontinued, and a communication service of a certain level can be continued even in a case where a handoff is performed from a communication area where high-speed data rates are supported to another communication area where only data rates which are slower than those of the foregoing data rates are supported.

A second characteristic of the present invention is summarized as the radio communication terminal according to the first characteristic, wherein the transmission controller stops or starts the transmission of the image data to the destination communication terminal based on the handoff.

A third characteristic of the present invention is summarized as the radio communication terminal according to any one of the first and second characteristics, wherein, the transmission controller transmits an image data transmission control request which requests control of the transmission of the image data by the destination communication terminal to the destination communication terminal based on the handoff.

A fourth characteristic of the present invention is summarized as the radio communication terminal according to any one of the first to third characteristics, which further includes a transmission control request receiver configured to receive an image data transmission control request which requests control of the transmission of the image data. In the radio communication terminal, the transmission controller controls the transmission of the image data in a case where the transmission control request receiver has received the image data transmission control request.

A fifth characteristic of the present invention is summarized as the radio communication terminal according to the fourth characteristic, wherein, in a case where the transmission control request receiver has received the image data transmission control request, the transmission controller stops or starts the transmission of the image data.

A sixth characteristic of the present invention is summarized as the radio communication terminal according to any one of the first to fifth characteristics, wherein, the transmission controller changes an encoding law based on the handoff to an encoding law whose data rate is slower or faster than that of the encoding law used for generating the image data before the handoff.

A seventh characteristic of the present invention is summarized as the radio communication terminal according to any one of the first to sixth characteristics, wherein, error corrections are applied to the image data by use of an error correction code (FEC), and the transmission controller increases or decreases, based on the handoff, the number of bits used for the error correction code.

An eighth characteristic of the present invention is summarized as the radio communication terminal according to any one of the first to seventh characteristics, wherein the communication capability of a communication mode means presence or absence of QoS control, or a QoS level.

A ninth characteristic of the present invention is summarized as the radio communication terminal according to any one of the first to eighth characteristics, wherein the communication capability of the communication mode means a maximum data rate in any one of an uplink and a downlink.

A tenth characteristic of the present invention is summarized as a communication method including the steps of: transmitting voice and image data to a destination communication terminal, and receiving the voice and image data from the destination communication terminal; controlling a handoff between communication modes of which communication capabilities are different from each other; and controlling the transmission of voice or image data in the transmitting/receiving step of the voice or image data, and/or the transmission of voice or image data by the destination communication terminal according to a communication capability of a communication mode at a destination of handoff, when the handoff is performed in the controlling step of the handoff in a case where the voice and image data are being transmitted to and received from the destination communication terminal.

An eleventh characteristic of the present invention is summarized as the communication method according to the tenth characteristic, wherein, in the step of controlling transmission, the transmission of the image data is stopped or started based on the handoff.

A twelfth characteristic of the present invention is summarized as the communication method according to any one of the tenth and eleventh characteristics, which further includes the step of receiving an image data transmission control request which requests control of the transmission of the image data. In the communication method, in the step of controlling transmission, the transmission of the image data is controlled in a case where the image data transmission control request has been received.

A thirteenth characteristic of the present invention is summarized as the communication method according to the twelfth characteristic, wherein, in the step of controlling transmission, the transmission of the image data is stopped or started in a case where the image data transmission control request has been received.

A fourteenth characteristic of the present invention is summarized as the communication method according to any one of the tenth to thirteenth characteristics, wherein, in the step of controlling transmission, an encoding law is changed, based on the handoff, to an encoding law whose data rate is slower or faster than that of an encoding law used for generating the image data before the handoff.

A fifteenth characteristic of the present invention is summarized as the communication method according to any one of the tenth to fourteenth characteristics, wherein, error corrections are applied to the image data using an error correction code, and the number of bits used for the error correction code is increased or decreased based on the handoff in the step of controlling transmission.

A sixteenth characteristic of the present invention is summarized as the communication method according to any one of the tenth to fifteenth characteristics, wherein the communication capability of a communication mode means any one of presence or absence of QoS control, and a QoS level.

A seventeenth characteristic of the present invention is summarized as the communication method according to any one of the tenth to sixteenth characteristics, wherein the communication capability of a communication mode means a maximum data rate in any one of an uplink and a downlink.

According to the characteristics of the present invention, it is possible to provide the radio communication terminal and the communication method which are capable of continuing a communication service of a certain level even in a case of performing a handoff between communication areas where communication modes having different communication capabilities are used.

DESCRIPTION OF THE PREFERRED EMBODIMENTS

Hereinafter, embodiments of a radio communication terminal according to the present invention will be described with reference to the accompanying drawings. Note that, in descriptions regarding the drawings, the same or similar reference numerals are assigned to the same or similar elements. However, it should be noted that, since the drawings are schematic, ratios of respective measurements, and the like, in respective drawings are different from the real ones.

Therefore, specific measurements and the like should be judged in consideration of the following descriptions. It is apparent that the drawings include parts in which relations and ratios of measurements among the drawings are different one another.

(An entire schematic configuration of a mobile communication system including radio communication terminals)

Figure 1:
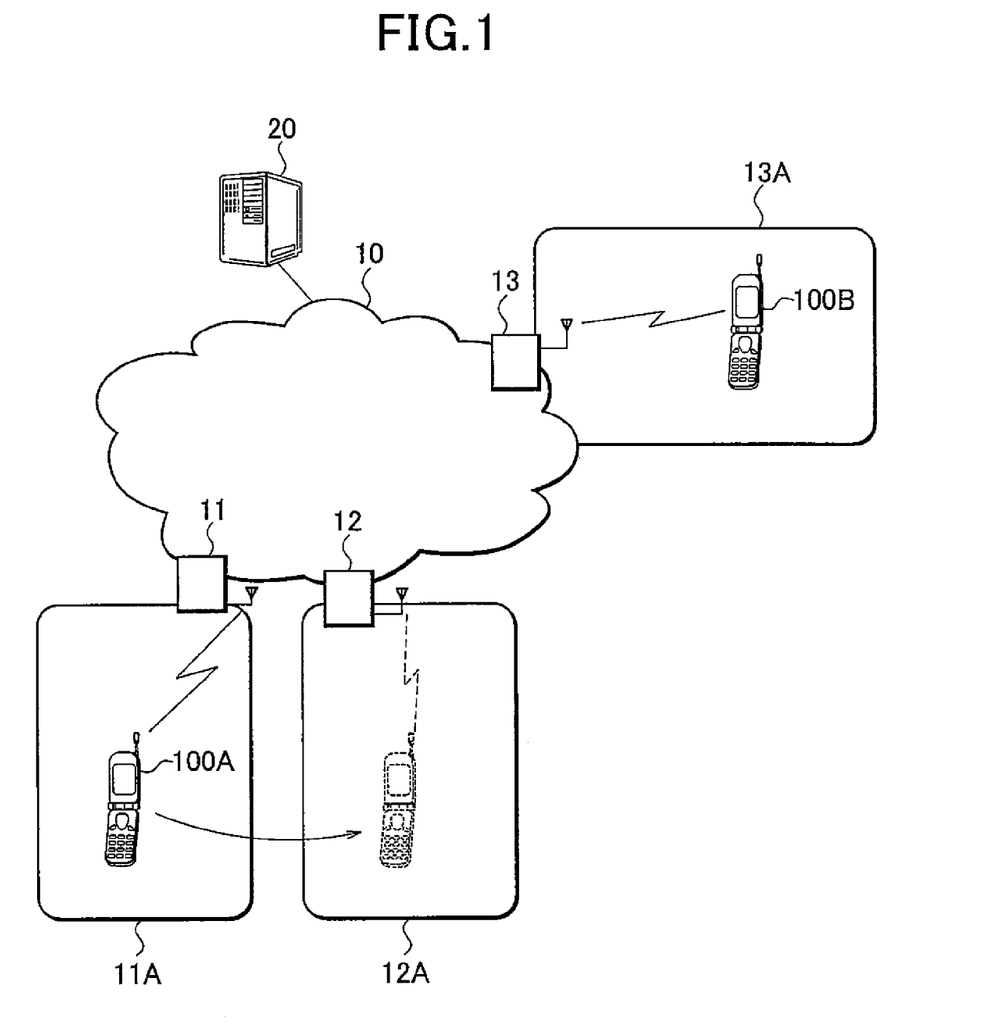
FIG. 1 is an entire schematic configuration diagram of a mobile communication system including radio communication terminals, according to an embodiment of the present invention.

FIG. 1 shows an entire schematic configuration of a mobile communication system including radio communication terminals according to this embodiment. As shown in FIG. 1, on a backbone network 10, radio base stations 11 to 13 executing radio communications between radio communication terminals 100A and 100B are deployed.

Additionally, an SIP server 20 is connected to the backbone network 10. The SIP server 20 executes processing such as control of connections between the radio communication terminals 100A and 100B3 according to SIP (Session Initiation Protocol such as RFC3261).

The radio base stations 11 to 13 form cells 11A to 13A, respectively, as communication areas where communications with the radio communication terminals 100A and 100B can be executed. For example, in a case where the radio communication terminal 100A moves from a location in the cell 11A to a location in the cell 12A, the radio communication terminal 100A performs a handoff (a handover) from the radio base station 11 to the radio base station 12.

The mobile communication system according to this embodiment is so-called the third-generation mobile communication system complying with cdma2000. The cells 11A and 13A are communication areas where 1x EV-DO Rev.A (a communication mode) realizing data rates. (high-speed data rates) of approximately 1.8 Mbps for an uplink and approximately 3.0 Mbps for a downlink is supported. On the other hand, the cell 12A is a communication area where 1x EV-DO Rev.0 (a communication mode) realizing data rates (low-speed data rates) of approximately 153.6 kbps for an uplink and approximately 2.4 Mbps for a downlink is supported.

Moreover, the radio communication terminals 100A and 100B do not support a conventional circuit switching system but they are each provided with a function of an IP-based videophone (hereinafter, referred to as the "IP videophone" as appropriate).

(A logical block configuration of a radio communication terminal)

Figure 2:
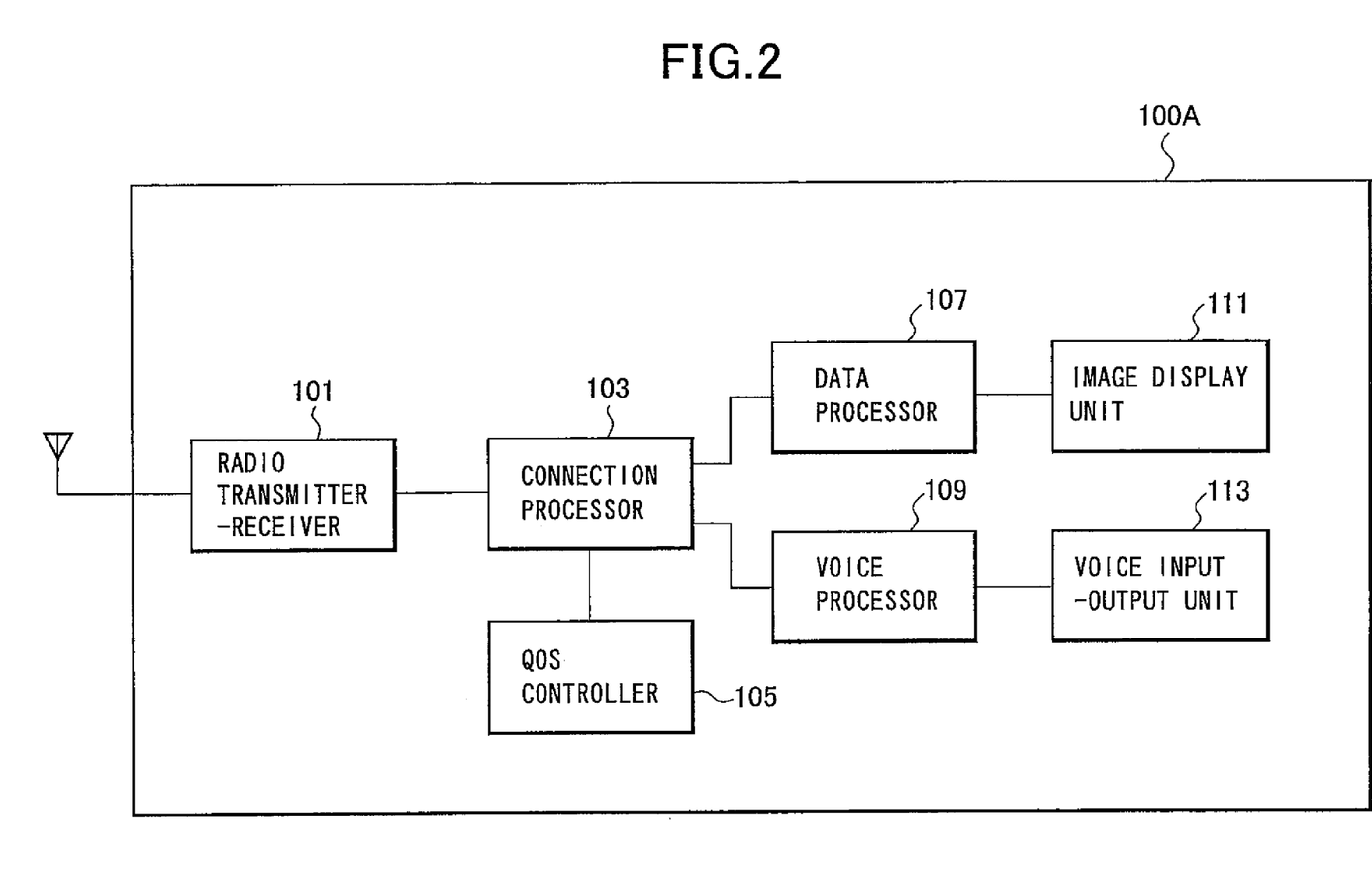
FIG. 2 is a logical block configuration diagram of the radio communication terminal according to the embodiment of the present invention.

FIG. 2 is a logical block configuration diagram of the radio communication terminal 100A. Note that the radio communication terminal 100B also has the same logical block configuration as the radio communication terminal 100A. Further, parts relating to the present invention will be mainly described hereinbelow. Therefore, it should be noted that the radio communication terminal 100A may be provided with a logical block for which an illustration or a description is omitted (a power supply unit for example), but the logical block being essential in realizing functions of the radio communication terminal 100A.

As shown in FIG. 2, the radio communication terminal 100A includes a radio transmitter-receiver 101, a connection processor 103, a QoS controller 105, a data processor 107, a voice processor 109, an image display unit 111 and a voice input-output unit 113.

The radio transmitter-receiver 101 provides functions for executing radio communications with the radio base stations 11 to 13. Specifically, the radio transmitter-receiver 101 executes various processing (orthogonal modulation, distributed processing, RAKE reception and the like) which is necessary to execute radio communications using a CDMA (code division multiple access) mode.

Additionally, the radio transmitter-receiver 101 transmits and receives voice and image data (for example, those for the IP videophone) to and from the radio communication terminal 100B (a destination communication terminal). In this embodiment, the radio transmitter-receiver 101 constitutes the transmitter-receiver.

The connection processor 103 executes processing relating to connections with the radio base stations 11 to 13, and with the radio communication terminal 1008. Particularly in this embodiment, the connection processor 103 controls a handoff between communication modes (for example, 1x EV-DO Rev.A and 1x EV-DO Rev.0) whose communication capabilities are different from each other.

Specifically, the connection processor 103 executes a handoff, from the cell 11A (a high-speed data rate communication area) formed by the radio base station 11, to the cell 12A (a low-speed data rate communication area) formed by the radio base station 12.

Additionally, the connection processor 103 detects a handoff from the cell 11A (a high-speed data rate communication area) to the cell 12A (a low-speed data rate communication area) formed by the radio base station 12.

Further, the connection processor 103 is capable of receiving an image data transmission control request, which requests control of image data transmission (for example, moving image data for the IP videophone) by the data processor 107, from a destination communication terminal (for example, the radio communication terminal 100B). In this embodiment, the connection processor 103 constitutes a transmission control request receiver.

The QoS controller 105 executes priority control (QoS control) of image data transmitted by the data processor 107, and of voice transmitted by the voice processor 109. Particularly in this embodiment, the QoS controller 105 is capable of changing data rates of image data for the IP videophone according to a congestion status of the backbone network 10.

Specifically, in a case where the QoS controller 105 is notified from the radio base stations 11 to 13 that the backbone network 10 is congested, the QoS controller 105 decreases a data rate of moving image data for the IP videophone. For example, in a case where the data rate of the moving image data for the IP videophone before the notification is 64 kbps, the QoS controller 105 is capable of decreasing the data rate to 32 kbps after the notification by notifying the data processor 107 of the congestion.

The data processor 107 executes processing relating to data such as image data and text data. Particularly in this embodiment, the data processor 107 controls transmission of image data to a destination communication terminal (for example, the radio communication terminal 100B) based on detection of a handoff by the connection processor 103.

Specifically, the data processor 107 stops transmission of image data (for example, moving image data for the IP videophone) to the destination communication terminal in a case where a handoff has been detected by the connection processor 103.

Additionally, the data processor 107 is capable of transmitting an image data transmission control request to a destination communication terminal (for example, the radio communication terminal 100B) based on detection of a handoff by the connection processor 103. The image data transmission control request is used for requesting a control of image data transmission by the destination communication terminal as described above.

Moreover, the data processor 107 is capable of controlling image data transmission (for example, moving image data for the IP videophone) in a case where the connection processor 103 has received an image data transmission control request from the destination communication terminal (for example, the radio communication terminal 100B).

Specifically, the data processor 107 stops the transmission of the image data in a case where the connection processor 103 has received the image data transmission control request.

Note that, instead of postponing the transmission of the image data, the data processor 107 may execute processing such as decreasing a frame rate of the image data or reducing an image size thereof.

Furthermore, based on detection of a handoff by the connection processor 103, the data processor 107 is capable of changing the encoding law (for example, ITU-T H.263) to a new encoding law (for example, MPEG-4) whose data rate is slower than that of the encoding law used for generating image data (for example, moving image data for the IP videophone) before the handoff.

In this embodiment, error corrections using an error correction code (FEC) at the IP level (or at layers higher than the IP level) are applied to image data transmitted and received at the data processor 107. The data processor 107 is capable of increasing the number of bits used for the error correction code based on detection of a handoff by the connection processor 103.

The voice processor 109 executes processing relating to voice band signals. Particularly in this embodiment, based on detection of a handoff by the connection processor 103, the data processor 107 is capable of changing the encoding law (for example, the AMR or adaptive multi rate) to a new encoding law (for example, the EVRC or enhanced variable rate codec) whose data rate is slower than that of the encoding law used for encoding voice band signals before the handoff.

In this embodiment, when the connection processor 103 performs a handoff in a case where voice and image data are transmitted to and received from a destination communication terminal (for example, the radio communication terminal 100B) through the radio transmitter-receiver 101, the data processor 107 and the voice processor 109 constitute the transmission controller. The data processor 107 and the voice processor 109 are configured to control transmission of voice or image data by the radio transmitter-receiver 101 and by the destination communication terminal according to "a communication capability of a communication mode at a destination of the handoff".

Note that the communication capability of a communication mode at a destination of the handoff is presence or absence of QoS control in the communication mode at the destination of the handoff (for example, a handoff from a communication area where 1x EV-DO Rev.A is supported, to a communication area where 1x EV-DO Rev.0 or a version lower than that is supported). Further, the communication capability of a communication mode at a destination of the handoff may be a maximum applicable data rate for an uplink or a downlink (refer to FIG. 6B for the uplink) Moreover, the communication capability of a communication mode at the destination of the handoff maybe an applicable QoS level.

The image display unit 111 is configured to display images such as moving images and characters processed in the data processor 107. Specifically, the image display unit 111 is configured by a small-size liquid crystal display device (for example, a QVGA liquid crystal display).

The voice input-output unit 113 executes input of voice band signals to be processed in the voice processor 109, and execute output of voice band signals having been processed in the voice processor 109. Specifically, the voice input-output unit 113 is configured by a microphone and a speaker.

(Operations of the Mobile Communication System)

Next, operations of the above described mobile communication system according to this embodiment will be described with reference to FIGS. 3 to 6B.

(1) Stop of moving image data transmission

Figure 3:
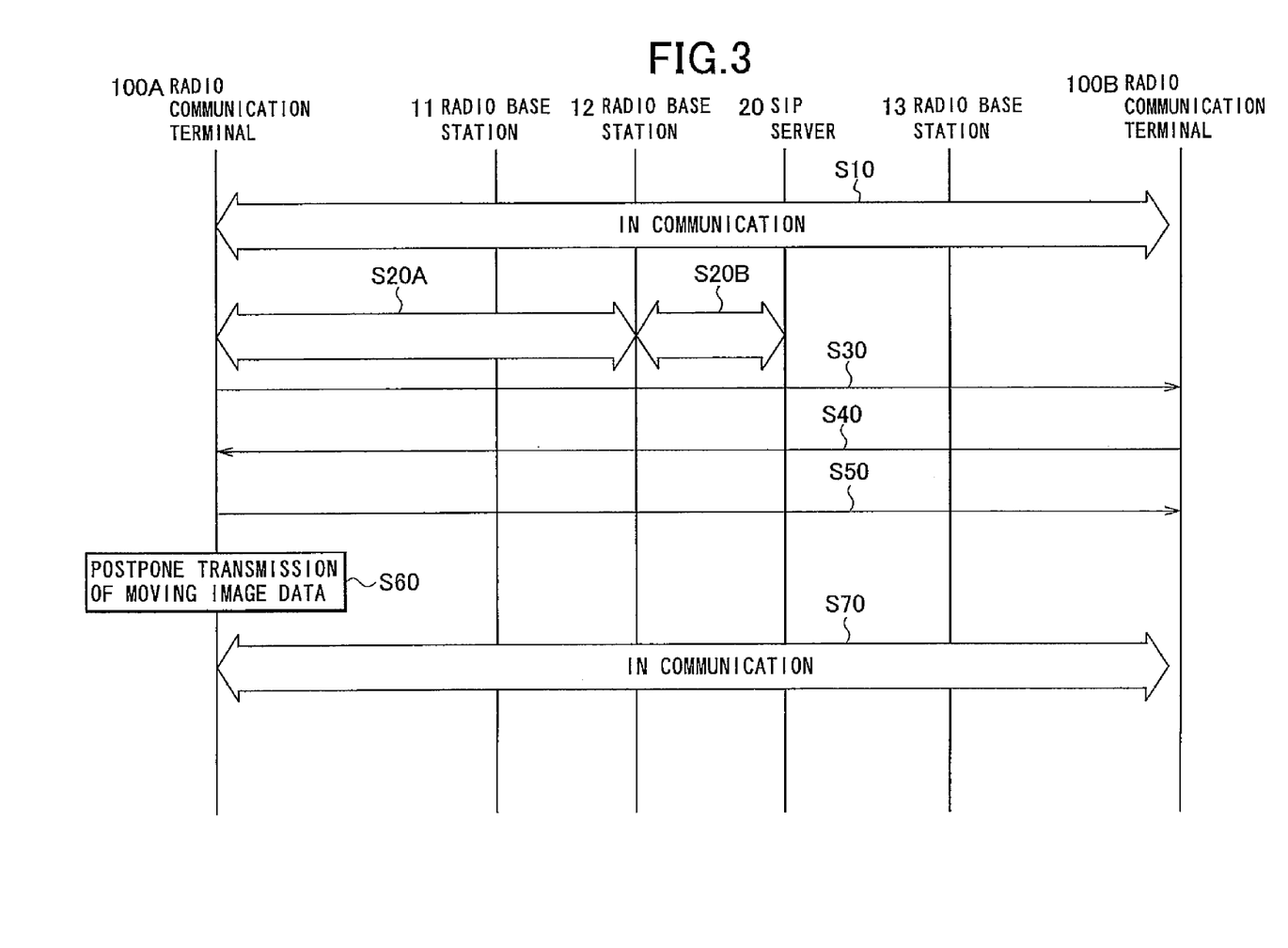
FIG. 3 is a diagram showing an operational flow of the mobile communication system according to the embodiment of the present invention.

FIG. 3 shows an operational sequence in a case where the radio communication terminal 100A moves from the cell 11A to the cell 12A and performs a handoff (a handover) from the radio base station 11 to the radio base station 12.

As described above, the cells 11A and 13A are communication areas where 1x EV-DO Rev.A is supported. On the other hand, the cell 12A is a communication area where 1x EV-DO Rev.0 is supported. That is, when a handoff is performed from the radio base station 11 to the radio base station 12, available data rates come to be limited (for example, limited from approx. 1.8 Mbps down to approx. 153.6 kbps for the uplink).

In Step S10, the radio communication terminals 100A and 100B execute communications therebetween by using an IP videophone application which transmits and receives voice and moving image data. Specifically, the communications between the radio communication terminals 101A and 100B are executed via the radio base station 11, the backbone network 10 and the radio base station 13.

Here, the radio communication terminal 100A moves from the cell 11A to the cell 12A during the radio communication terminals 100A and 100B are executing the communications therebetween by using the IP videophone application (refer to FIG. 1).

When the radio communication terminal 100A moves from the cell 11A to the cell 12A, in Steps S20A and S20B, the radio communication terminal 100A, the radio base station 12 and the SIP server 20 execute processing relating to a handoff of the radio communication terminal 100A from the radio base station 11 to the radio base station 12.

In the processing in Step S20A, the radio communication terminal 10A recognizes that the radio base station 12 supports only 1x EV-DO Rev.0 from a message transmitted from the radio base station 12.

In Step S30, the radio communication terminal 101A transmits a "re-INVITE" message (a request for reinitiating a call) according to the SIP to the radio communication terminal 100B. At this point, a data rate to be used after the handoff is reported.

In Step S40, in response to the "re-INVITE" message received from the radio communication terminal 100A, the radio communication terminal 100B transmits a "200 OK" message (a success notification) to the radio communication terminal 100A.

In Step S50, in response to the "200 OK" message received from the radio communication terminal 100B, the radio communication terminal 101A transmits an "ACK" message to the radio communication terminal 100B.

The radio communication terminal 100A recognizes in the above described processing in Step S20A that data transmission to and from the radio base station 12 is to be executed by using 1x EV-DO Rev. 0, not by using 1x EV-DO Rev.A. For this reason, in this embodiment, in Step S60, the radio communication terminal 100A stops transmission of moving image data for the IP videophone, which are being transmitted to the radio communication terminal 100B.

Figure 6A:
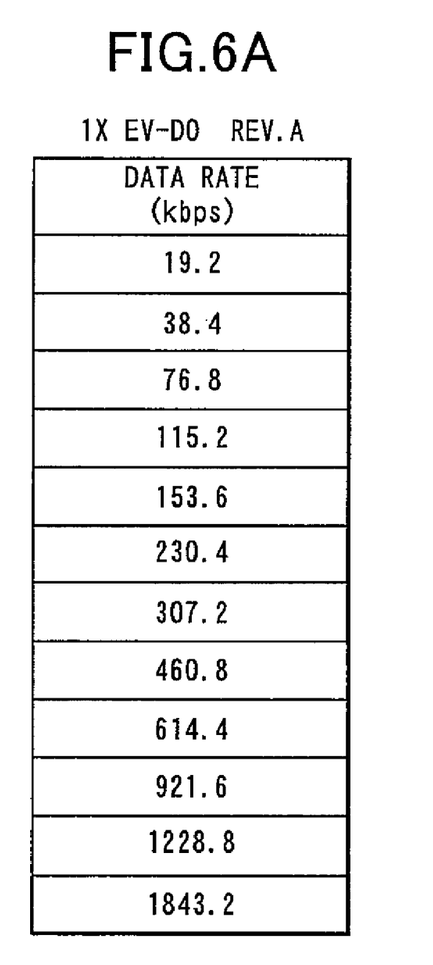
FIGS. 6A and 6B are diagrams each showing one example of data rates used in the mobile communication system according to the embodiment of the present invention.
Figure 6B:
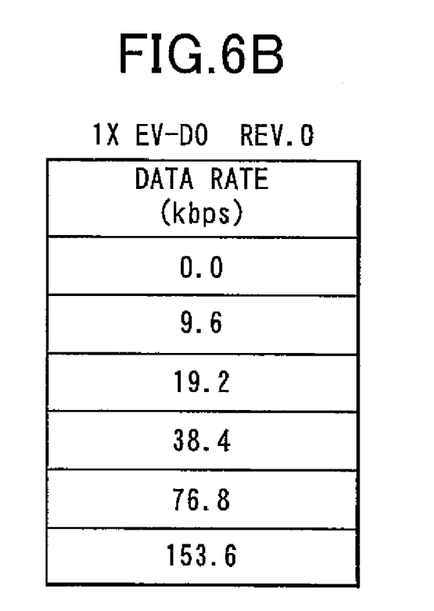

Specifically, as shown in FIGS. 6A and 6B, data rates in a direction from the radio communication terminal 100A to the radio communication terminal 100B (the uplink for the radio communication terminal 100A) are limited.

In Step S70, the radio communication terminals 100A and 100B continue executing the communications therebetween by using the IP videophone application which transmits and receives voice and moving image data.

Note that, since the radio communication terminal 100A stops the transmission of the moving image data in Step S60, moving image data for the IP videophone are transmitted only in a direction from the radio communication terminal 100B to the radio communication terminal 100A. Additionally, although the transmission of the moving image data is stopped in Step S60, another processing such as decreasing a frame rate of the moving image data according to a data rate after the handoff (refer to FIGS. 6A and 6B), reducing an image size thereof, or the like maybe executed, instead of postponing the transmission of the moving image data, as described above.

Incidentally, the above described processing in Step S30 (transmission of the "re-INVITE" message) may be executed before the handoff processing in Steps S20A and S20B.

(2) Modification

In the above described operation of postponing transmission of moving image data, the cells 11A and 13A are communication areas where 1x EV-DO Rev.A is supported, and the cell 12A is a communication area where 1x EV-DO Rev.0 is supported. Here, with reference to FIG. 4, a description will be given of an operational flow in a case where the cells 11A and 13A are 1x EV-DO Rev.0 supported communication areas and the cell 12A is 1x supported communication area.

Figure 4:
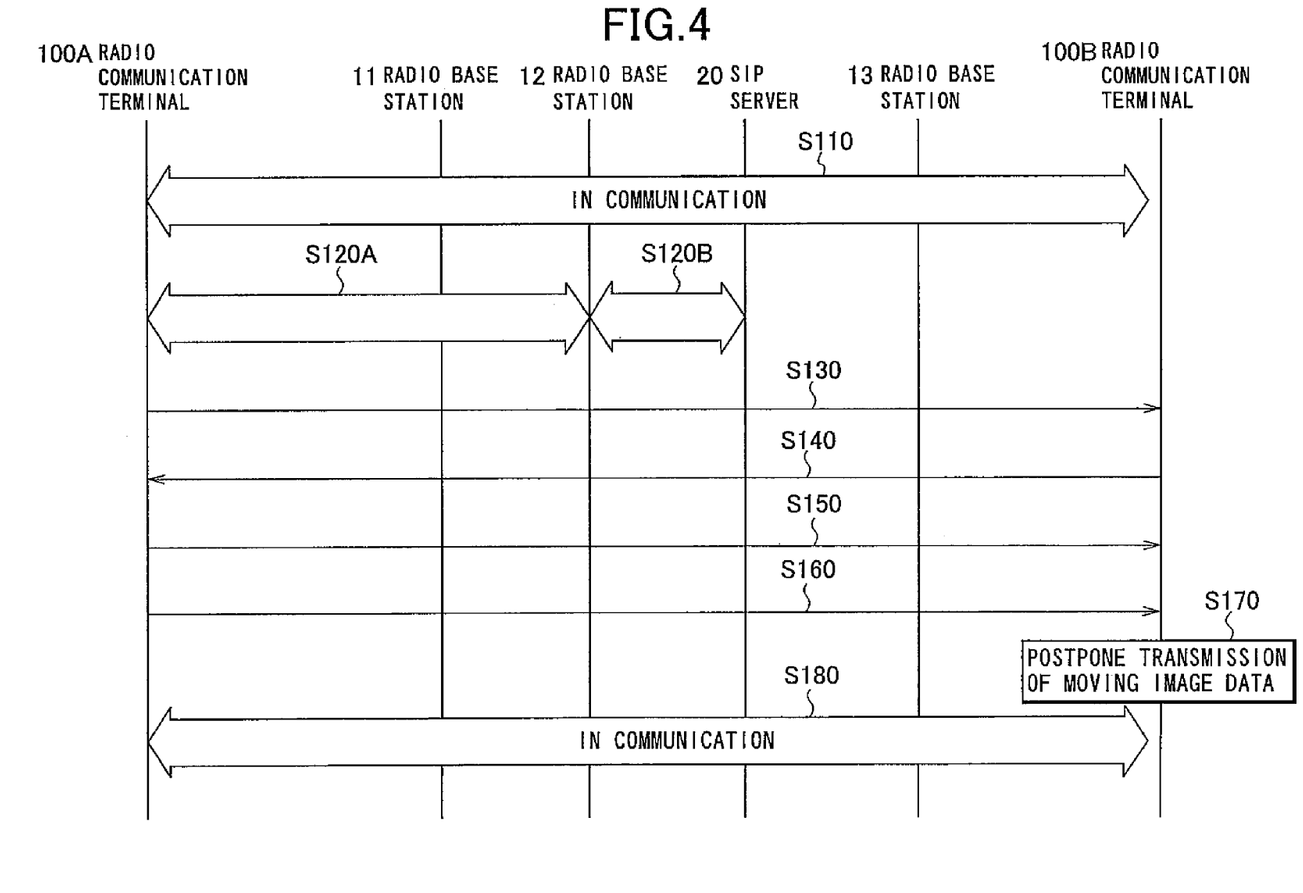
FIG. 4 is a diagram showing an operational flow of the mobile communication system according to the embodiment of the present invention.

One of differences of this operational flow from the operational flow shown in FIG. 3 is that: in a case where the radio communication terminal 100A performs a handoff from the radio base station 11 to the radio base station 12, it is necessary to limit (control) transmission of moving image data s transmitted by the radio communication terminal 100B, since a data rate in a direction from the radio base station 12 to the radio communication terminal 100A is largely limited in a case of a change from 1x EV-DO Rev.0 to 1x.

Hereinbelow, differences of this operational flow from the operational flow shown in FIG. 3 will be mainly described, and descriptions will be omitted for the same operations.

Processing in Steps S110 to S150 shown in FIG. 4 is the same as the processing in Steps S10 to S50 shown in FIG. 3.

In Step S160, the radio communication terminal 100A recognizes that data transmission to and from the radio base station 12 is to be executed by using 1x, not by using 1x EV-DO Rev.0, and then transmits an image data transmission control request, which requests the radio communication terminal 100B to stop (control) transmission of moving image data for the IP videophone, to the radio communication terminal 100B.

In Step S170, based on the image data transmission control request received from the radio communication terminal 100A, the radio communication terminal 100B stops transmission of the moving image data for the IP videophone which are being transmitted to the radio communication terminal 100A.

In Step S180, the radio communication terminals 101A and 100B continue executing the communications therebetween only by voice, even in a case where moving image data has come to be no longer transmitted from the radio communication terminal 100B to the radio communication terminal 100A.

Note that the image data transmission control request transmitted in Step S160 can be transmitted as a message according to the SIP, or as a message in a further higher layer (for example, user data).

(3) Change of QoS levels

Figure 5:
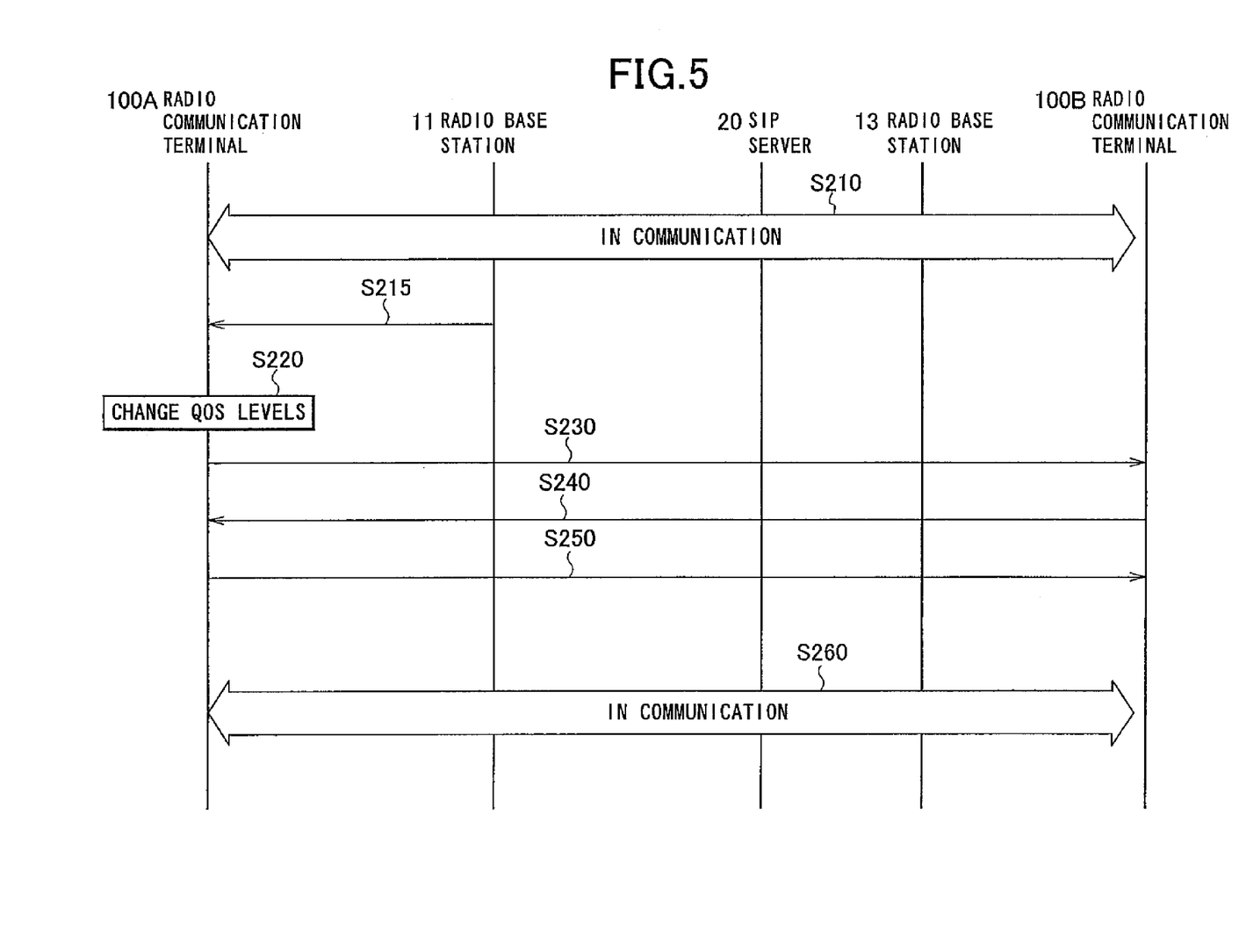
FIG. 5 is a diagram showing an operational flow of the mobile communication system according to the embodiment of the present invention.

FIG. 5 shows an operational sequence in a case where the radio communication terminal 100A changes QoS levels of moving image data. Note that the cells 11A to 13A (all of the cells) are assumed communication areas where 1x EV-DO Rev.A is supported.

In Step S210, the radio communication terminals 100A and 100B execute communications therebetween by an IP videophone application which transmits and receives voice and moving image data.

In Step S215, the radio base station 11 transmits a congestion notification indicating that a congestion of traffic is occurring in the backbone network 10 to the radio communication terminals 100A.

In Step S220, based on the congestion notification received from the radio base station 11, the radio communication terminals 100A changes QoS levels applied to moving image data for the IP videophone.

For example, in a case where a data rate for moving image data for the IP videophone is 64 kbps before the notification, the radio communication terminals 100A notifies the data processor 117 of the congestion, and thereby reduces the data rate after the notification to 32 kbps.

In Step S230, the radio communication terminal 100A transmits a "re-INVITE" message (a request for reinitiating a call) according to the SIP to the radio communication terminal 100B. At this point, a data rate designated by the radio base station 11 is reported.

In Step S240, in response to the "re-INVITE" message received from the radio communication terminal 100A, the radio communication terminal 100B transmits a "200 OK" message (a success notification) to the radio communication terminal 100A.

In Step S250, in response to the "200 OK" message received from the radio communication terminal 100B, the radio communication terminal 100A transmits an "ACK" message to the radio communication terminal 100B.

In Step S260, the radio communication terminals 100A and 100B continue executing the communications therebetween by using the IP videophone application which transmits and receives voice and moving image data.

(Effects and Advantages)

By the above described mobile communication system (the radio communication terminal 100A) according to this embodiment, transmission of moving image data to the radio communication terminal 100B is limited accompanying with a handoff from the cell 11A (a high-speed data rate communication area) to the cell 12A (a low-speed data rate communication area). Accordingly, a communication service of a certain level can be continued without discontinuing communications with the radio communication terminal 100B even in a case of performing a handoff from a cell (a communication area) where high-speed data rates are supported, to another cell where only data rates which are slower than the high-speed data rates are supported.

By the radio communication terminal 100A, an image data transmission control request, which limits transmission of moving image data by a destination communication terminal (for example, the radio communication terminal 100B), is transmitted to the destination communication terminal based on detection of a handoff.

Accordingly, it is possible to control the transmission of the moving image data by the destination communication terminal when limitation a data rate for a downlink is needed in a case where executing a handoff from a cell (a communication area) supporting 1x EV-DO Rev. 0, to another cell supporting only 1x.

By the radio communication terminal 100A, it is possible to change QoS levels, encoding laws for moving image data (and voice), and the number of bits used for an error correction code (FEC) according to congestion in the backbone network 10, and with a data rate used after a handoff. Accordingly, it is possible to timely set up appropriate parameters according to communication environments thereof.

(Other Embodiments)

Although a content of the present invention is disclosed by way of one embodiment of the present invention as described hereinabove, it should not be understood that descriptions and drawings forming a part of this disclosure limit the present invention. From this disclosure, various alternative embodiments will become apparent to those skilled in the art.

For example, in the above described embodiment of the present invention, the radio communication terminal 100A changes QoS levels applied to moving image data for the IP videophone based on the congestion notification received from the base station 11. However, instead of changing QoS levels or together with changing QoS levels, an encoding law used for generating the moving image data may be changed (for example, from ITU-T H.263 to MPEG-4).

Note that the above described changes of QoS levels and is of encoding laws are not limited to those relating to moving image data. QoS levels relating to voice for the IP videophone may be changed and encoding laws relating to the voice may also be changed (for example, from the EVRC to the AMR). Additionally, it is also possible to adopt a configuration where the number of bits used in an error correction code (FEC) having been applied to moving image data is increased based on a congestion notification received from the radio base station 11. Furthermore, the change of QoS levels, the change of encoding laws and the increase of the number of bits used for an error correction code, all of which have been described above, may be executed in the operational sequences shown in FIGS. 3 and 4.

Additionally, in the above described embodiment of the present invention, a handoff from 1x EV-DO Rev.A to 1x EV-DO Rev.0, or from 1x EV-DO Rev.0 to 1x, i.e., a handoff (a system hand-down) to a communication mode with a lower communication capability, has been described. However, the present invention can be applied to a handoff from x to 1x EV-DO Rev.0, from 1x EV-DO Rev.0 to 1x EV-DO Rev.A, i.e., a handoff (a system hand-up) to a communication mode with a higher communication capability.

For example, in the case of performing a system hand-up, it is only necessary to start transmission of image data, to increase a frame rate, or to decrease the number of bits used for an error correction coder immediately after a handoff to a radio base station supporting a communication mode with a higher communication capability is performed. That is, it is only necessary to execute control reverse to the control in the above described embodiment of the present invention.

Thus, it is apparent that the present invention includes various embodiments which are not herein described. Therefore, a technical scope of the present invention should be defined only by invention specifications according to the scope of claim which are appropriate based on the above descriptions.

What is claimed is:

1. A radio communication terminal comprising:
   a transmitter-receiver configured to transmit voice and image data to a destination communication terminal, and to receive the voice and image data from the destination communication terminal;
   a connection processor configured to control a handoff between communication modes of which communication capabilities are different from each other; and
   a transmission controller configured to control the transmission of voice or image data by the transmitter-receiver, and/or the transmission of voice or image data by the destination communication terminal according to a communication capability of a communication mode at a destination of handoff, when the connection processor performs the handoff in a case where the voice and image data are being transmitted to and received from the destination communication terminal through the transmitter-receiver.

2. The radio communication terminal of claim 1, wherein the transmission controller stops or starts the transmission of the image data to the destination communication terminal based on the handoff.

3. The radio communication terminal of claim 1, wherein the transmission controller transmits an image data transmission control request which requests control of the transmission of the image data by the destination communication terminal to the destination communication terminal based on the handoff.

4. The radio communication terminal of claim 1, further comprising a transmission control request receiver configured to receive an image data transmission control request which requests control of the transmission of the image data, wherein,
   in a case where the transmission control request receiver has received the image data transmission control request, the transmission controller controls the transmission of the image data.

5. The radio communication terminal according to claim 4, wherein, in a case where the transmission control request receiver has received the image data transmission control request, the transmission controller stops or starts the transmission of the image data.

6. The radio communication terminal of claim 1, wherein the transmission controller changes an encoding law based on the handoff to an encoding law whose data rate is slower or faster than that of the encoding law used for generating the image data before the handoff.

7. The radio communication terminal of claim 1, wherein error corrections using an error correction code are applied to the image data, and the transmission controller increases or decreases the number of bits used for the error correction code based on the handoff.

8. The radio communication terminal of claim 1, wherein the communication capability of the communication mode means any one of presence or absence of QoS control, and a QoS level.

9. The radio communication terminal of claim 1, wherein the communication capability of the communication mode means a maximum data rate in any one of an uplink and a downlink.

10. A communication method comprising the steps of:
    transmitting voice and image data to a destination communication terminal, and receiving the voice and image data from the destination communication terminal;
    controlling a handoff between communication modes of which communication capabilities are different from each other; and
    controlling the transmission of voice or image data in the transmitting/receiving step of the voice or image data, and/or the transmission of voice or image data by the destination communication terminal according to a communication capability of a communication mode at a destination of a handoff, when the handoff is performed in the controlling step of the handoff in a case where the voice and image data are being transmitted to and received from the destination communication terminal.

11. The communication method of claim 10, wherein in the step of controlling transmission, the transmission of the image data is stopped or started based on the handoff.

12. The communication method of claim 10, further comprising the step of receiving an image data transmission control request which requests control of the transmission of the image data, wherein, in the step of controlling transmission, the transmission of the image data is controlled in a case where the image data transmission control request has been received.

13. The communication method of claim 12, wherein, in the step of controlling transmission, the transmission of the image data is stopped or started in a case where the image data transmission control request has been received.

14. The communication method claim 10, wherein in the step of controlling transmission, an encoding law is changed, based on the handoff, to an encoding law whose data rate is slower or faster than that of an encoding law used for generating the image data before the handoff.

15. The communication method of claim 10, wherein error corrections using an error correction code are applied to the image data, and the number of bits used for the error correction code is increased or decreased based on the handoff in the step of controlling transmission.

16. The communication method of claim 10, wherein the communication capability of a communication mode means any one of presence or absence of QoS control, and a QoS level.

17. The communication method of claim 10, wherein the communication capability of a communication mode means a maximum data rate in any one of an uplink and a downlink.

* * * * *